US011855422B2

(12) United States Patent
Scarlata et al.

(10) Patent No.: US 11,855,422 B2
(45) Date of Patent: Dec. 26, 2023

(54) CABLE GLAND INCLUDING INTERNAL DAM

(71) Applicant: Eaton Intelligent Power Limited, Dublin (IE)

(72) Inventors: Andrew F. Scarlata, West Monroe, NY (US); Joel Furco, Baldwinsville, NY (US); Joseph Platt, Baldwinsville, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 309 days.

(21) Appl. No.: 17/284,697

(22) PCT Filed: Oct. 11, 2019

(86) PCT No.: PCT/EP2019/025344
§ 371 (c)(1),
(2) Date: Apr. 12, 2021

(87) PCT Pub. No.: WO2020/074124
PCT Pub. Date: Apr. 16, 2020

(65) Prior Publication Data
US 2021/0344183 A1 Nov. 4, 2021

Related U.S. Application Data

(60) Provisional application No. 62/811,591, filed on Feb. 28, 2019, provisional application No. 62/745,149, filed on Oct. 12, 2018.

(51) Int. Cl.
*H02G 15/04* (2006.01)
*H02G 3/06* (2006.01)
(Continued)

(52) U.S. Cl.
CPC ......... *H02G 15/046* (2013.01); *H02G 3/0608* (2013.01); *H02G 15/003* (2013.01); *H02G 15/013* (2013.01)

(58) Field of Classification Search
CPC .. H02G 15/046; H02G 3/0608; H02G 15/003; H02G 15/013; H02G 3/0666; H02G 3/0675
See application file for complete search history.

(56) References Cited

U.S. PATENT DOCUMENTS 2,967,795 A * 1/1961 Bollmeier ............ H02G 15/003
264/269
3,419,669 A * 12/1968 Dienes .................. H02G 15/18
249/173
(Continued)

FOREIGN PATENT DOCUMENTS

AU 2002100038 A4 2/2002
AU 2005100101 A4 * 3/2005 ............ F21V 29/004
(Continued)

OTHER PUBLICATIONS

"Eaton Terminator (TM) TMCX II Gland Animation". Summit Electric Supply. https://www.youtube.com/watch?v=C8VGRxozudY. (Year: 2014).*
(Continued)

*Primary Examiner* — Timothy J. Dole
*Assistant Examiner* — Muhammed Azam
(74) *Attorney, Agent, or Firm* — Stinson LLP

(57) ABSTRACT

A cable gland includes a cavity having first and second axial ends and configured to receive one or more conductors and a curable liquid therein, and an internal dam. The internal dam is adjacent the second axial end of the cavity. The internal dam includes an annular filament holder and a plurality of filaments secured to and extending radially inward from the annular filament holder to receive the one
(Continued)

or more conductors to inhibit curable liquid from flowing through the dam and between the dam and the one or more conductors of a cable.

20 Claims, 8 Drawing Sheets

(51) Int. Cl.
  *H02G 15/00* (2006.01)
  *H02G 15/013* (2006.01)

(56) References Cited

U.S. PATENT DOCUMENTS

| | | | | | |
|---|---|---|---|---|---|
| 3,499,972 | A | * | 3/1970 | Smith | H02G 15/003 174/76 |
| 3,879,574 | A | * | 4/1975 | Filreis | H02G 15/003 174/76 |
| 4,419,156 | A | * | 12/1983 | Diaz | H02G 15/003 156/49 |
| 5,466,890 | A | * | 11/1995 | Stagnitti | F16L 25/01 174/12 R |
| 5,486,664 | A | * | 1/1996 | Lamp | H02G 3/185 439/942 |
| 7,361,836 | B2 | * | 4/2008 | Goehlich | H02G 15/06 174/76 |
| 7,706,892 | B2 | * | 4/2010 | Colvin | A61N 1/05 607/116 |
| 8,069,521 | B2 | * | 12/2011 | Beck | B08B 9/023 15/104.04 |
| 8,496,578 | B2 | * | 7/2013 | Surti | A61B 17/12013 606/139 |
| 9,640,965 | B1 | * | 5/2017 | Long | H02G 15/007 |
| 2008/0073102 | A1 | * | 3/2008 | Mueller | H02G 3/22 174/78 |
| 2009/0166084 | A1 | | 7/2009 | Mirebeau et al. | |
| 2011/0162881 | A1 | * | 7/2011 | Schipporeit | H02G 15/013 174/70 R |
| 2012/0312593 | A1 | * | 12/2012 | Aldrich | H02G 3/083 174/653 |
| 2014/0262500 | A1 | * | 9/2014 | Yaworski | H02G 15/08 174/84 R |
| 2017/0302063 | A1 | * | 10/2017 | Proud | B29C 70/682 |
| 2017/0373452 | A1 | * | 12/2017 | Diop | H01R 4/52 |
| 2018/0351341 | A1 | * | 12/2018 | Hutsler | H01R 13/5205 |
| 2020/0106255 | A1 | * | 4/2020 | Platt | H02G 15/02 |
| 2021/0013707 | A1 | * | 1/2021 | Santoro | B29C 70/745 |

FOREIGN PATENT DOCUMENTS

| | | | | |
|---|---|---|---|---|
| BR | 202014004848 U2 * | 9/2016 | | |
| BR | 102019018372 A2 * | 3/2020 | | G02B 6/4404 |
| CA | 2875463 A1 | 6/2015 | | |
| CA | 3028162 A1 * | 1/2018 | | H01R 11/09 |
| CN | 2328097 Y | 7/1999 | | |
| CN | 103036181 A | 4/2013 | | |
| CN | 104734107 A | 6/2015 | | |
| CN | 105020481 A | 11/2015 | | |
| CN | 106413750 A * | 2/2017 | | A61K 47/68 |
| CN | 106463935 A * | 2/2017 | | H01B 7/282 |
| DE | 3216431 A1 * | 11/1983 | | |
| DE | 3303621 A1 * | 8/1984 | | |
| DE | 3602150 A1 * | 7/1987 | | |
| DE | 3841964 A1 * | 6/1989 | | |
| DE | 10019452 A1 * | 10/2001 | | H02G 15/007 |
| DE | 10022505 C1 * | 10/2001 | | H01R 13/622 |
| DE | 10356386 B3 * | 5/2005 | | H02G 3/0666 |
| DE | 10054714 B4 * | 9/2005 | | B29C 45/1671 |
| DE | 60217879 T2 * | 11/2007 | | F16L 5/10 |
| DE | 102014115745 A1 * | 5/2015 | | H02G 15/013 |
| DE | 102015106094 A1 * | 11/2016 | | |
| EP | 0025691 A1 * | 3/1981 | | |
| EP | 1710885 A2 * | 10/2006 | | H02G 15/04 |
| EP | 1710885 A2 | 10/2006 | | |
| EP | 2479857 A2 * | 7/2012 | | H02G 3/0666 |
| EP | 2487480 A1 * | 8/2012 | | G01N 21/15 |
| GB | 1483281 A | 8/1977 | | |
| GB | 2130446 A * | 5/1984 | | H02G 15/04 |
| GB | 2215921 A | 9/1989 | | |
| GB | 2222323 A * | 2/1990 | | E21B 17/028 |
| GB | 2534965 A * | 8/2016 | | H02G 15/007 |
| KR | 20120007314 A * | 1/2012 | | |
| KR | 101132360 B1 * | 3/2012 | | |
| KR | 20120019264 A * | 3/2012 | | |
| KR | 101451397 B1 * | 10/2014 | | |
| KR | 20160009305 A * | 1/2016 | | |
| RU | 2527914 C2 * | 9/2014 | | F16L 5/08 |
| SU | 1332439 A1 * | 8/1987 | | |
| WO | WO-2014128231 A1 * | 8/2014 | | A62B 18/08 |
| WO | WO-2019079590 A1 * | 4/2019 | | H02G 15/007 |
| WO | WO-2020074124 A1 * | 4/2020 | | G02G 15/003 |

OTHER PUBLICATIONS

EP1710885_Translated_Original. EPO (Year: 2006).*
First Office Action, and translation thereof, from counterpart CN Application No. 2019800684365,, dated Jun. 10, 2022, 16 pages.
International Search Report and Written Opinion for PCT/EP2019/025344, dated Dec. 19, 2019, 10 pages, Netherlands.
Lapp: "SKINTOP Brush Add-on", Youtube, Apr. 28, 2014, 1 page, (XP054979962) Retrieved from the Internet on Nov. 29, 2019 at https://youtu.be/mrpZ3Xc3TqU28.
App Group: "SKINTOP MS-M Brush", Lapp Group, Mar. 15, 2010 (XP055646982) Retrieved from the Internet on Nov. 27, 2019 at: URL:https://t3.lappcdn.com/fileadmin/DAM/Lapp_USA/Brochures/SKINTOPBrush.pdf.
Notice of Allowance and Search Report from CN Application No. 2019800684365, dated May 9, 2023, 3 pages.

* cited by examiner

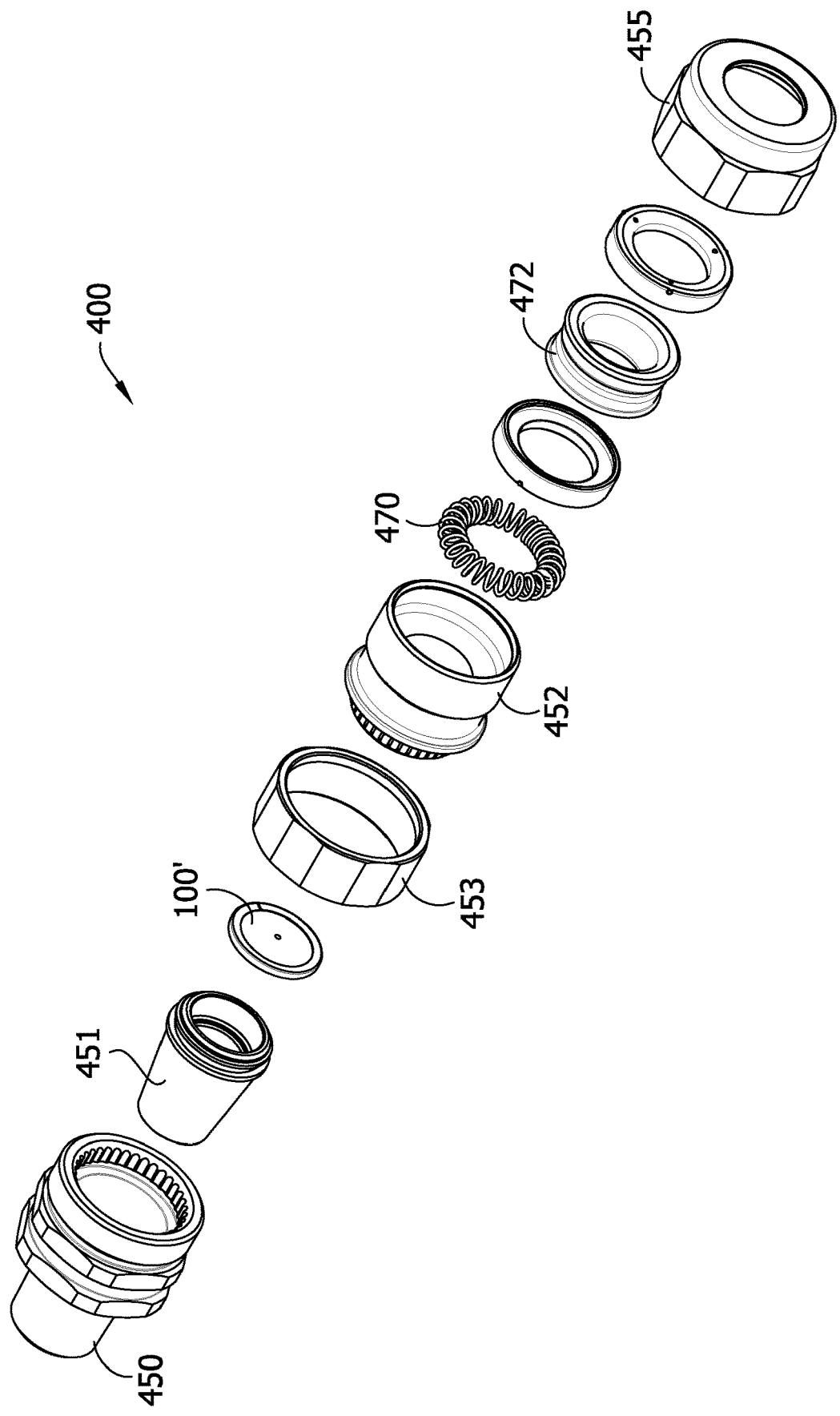

CABLE GLAND INCLUDING INTERNAL DAM

FIELD OF THE DISCLOSURE

The present disclosure generally relates to a cable gland including an internal dam and a method of installing an internal damn in a cable gland.

BACKGROUND

Cable gland assemblies are used for terminating cable in hazardous and nonhazardous environments. Typical cable gland assemblies provide a seal around the conductors of the cable, mechanical retention of the cable therein, electrical continuity via the termination of the cable, and an environmental seal on the outer jacket of the cable. To seal the conductors within a sealing chamber of the cable gland assembly, a sealing compound is generally used to seal the individual conductors. Generally, the sealing compound is used in conjunction with a secondary damming material to prevent the flow of the sealing compound beyond the sealing chamber. Conventional damming materials include fiber materials that require the cable gland assembly to be disassembled to place the fiber materials therein. In addition, these fiber damming materials generally require a large volume to contain the material therein.

BRIEF DESCRIPTION OF THE DRAWINGS

FIG. 8 is an exploded view of the cable gland.

Corresponding reference characters indicate corresponding parts throughout the drawings.

DETAILED DESCRIPTION OF THE DISCLOSURE

The present disclosure is directed to a cable gland including an internal dam configured to surround and engage cable conductors within the cable gland to inhibit the egress of a curable liquid from a compound cavity, such as one defined by a compound chamber, of the cable gland during curing of the liquid. The dam allows one or more cable conductors to pass through a center of the dam. The dam generally seals around the cable conductor(s) to inhibit the curable liquid from flowing through the dam along the conductor(s). The curable liquid may be any liquid-based, flowable product that hardens after it is poured or otherwise delivered into the compound chamber of the cable gland. Suitable curable liquids are generally known.

Figure 1:
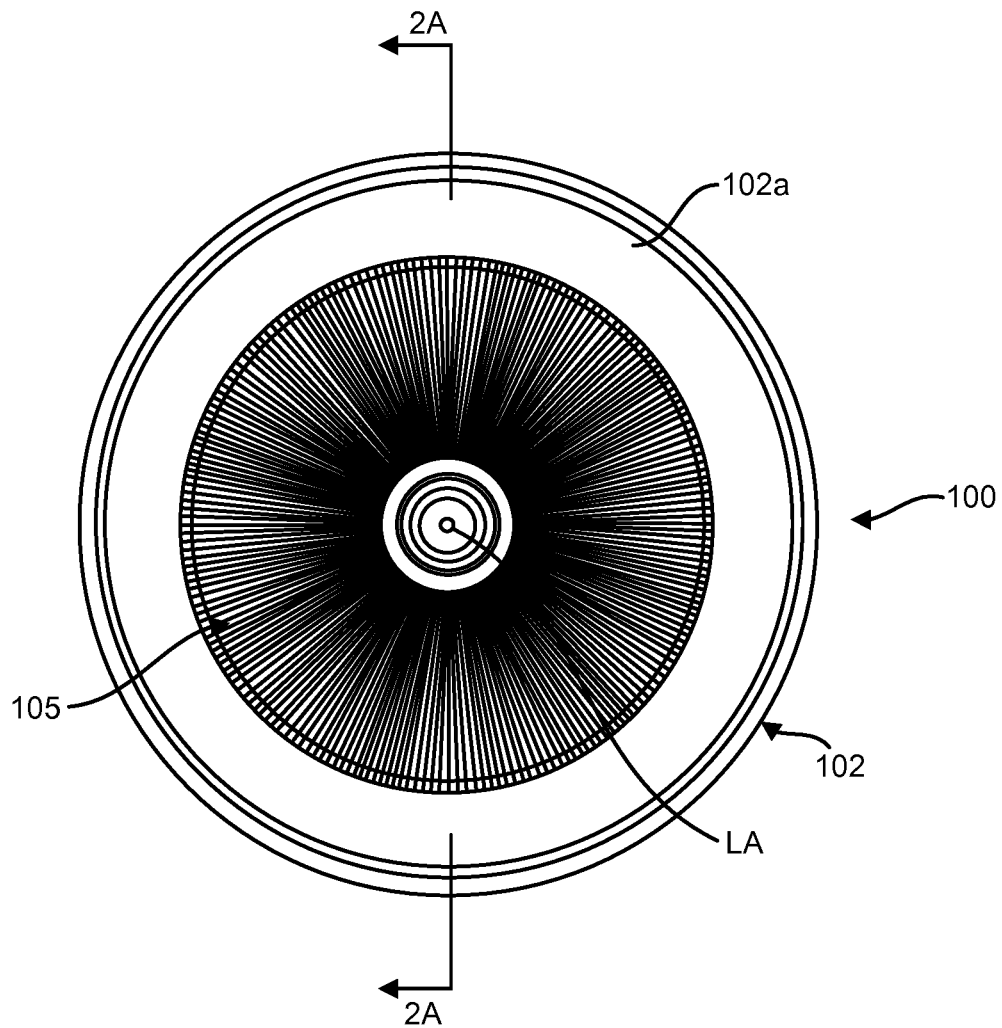
FIG. 1 is a front elevation of an internal dam for a cable gland.
Figure 2:
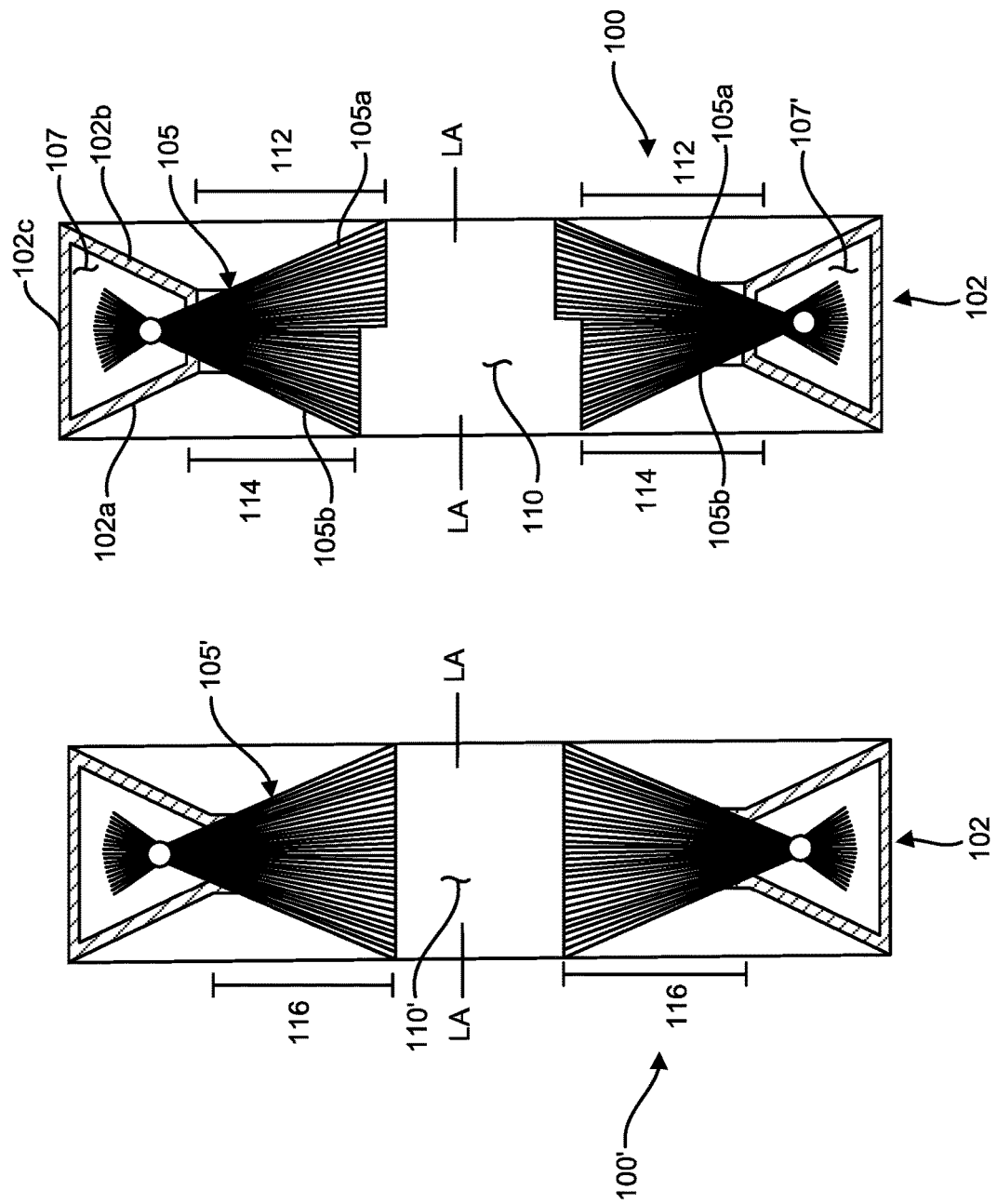
FIG. 2A is cross-sectional view of the internal dam of FIG. 1 taken in the plane defined by line 2A-2A in FIG. 1.
FIG. 2B is a cross-sectional view of another embodiment of an internal dam for a cable gland.

Referring to FIGS. 1 and 2A, one embodiment of an internal dam constructed according to the teachings of the present disclosure is generally indicated at reference numeral 100. The internal dam 100 generally includes an annular filament holder, generally indicated at 102 (e.g., an annular ferrule), and a plurality of filaments, generally indicated at 105 (e.g., fibers, wires, threads, strands, etc.), secured to and extending radially inward from the annular filament holder generally toward a longitudinal axis LA of the annular filament holder. The illustrated annular filament holder 102 comprises a channel member having opposing front and rear walls 102a, 102b, respectively, and a circumferential outer wall 102c connecting the front and rear walls to define a channel 107. The front and rear walls 102a, 102b are crimped onto the plurality of filaments 105 to hold the filaments in their respective circumferential positions. It is understood that the filaments 105 may be secured to the holder 102 in other ways, including adhesive, welding, or bonding. Moreover, the holder 102 may be of other constructions for holding the filaments 105. The annular filament holder 102 can be made of a suitable material for holding the filaments 105, such as metal (e.g., steel, galvanized steel, or aluminum), plastic or elastomeric material (e.g., polychloroprene, neoprene, other rubbers produced by polymerization of chloroprene, urethane, or silicone).

Referring to FIG. 2A, the filaments 105 extend radially inward from the annular filament holder 102 to define an average inner radial extent that is less than the radius of the interior defined by the annular filament holder 102 such that the free ends of the filaments do not extend to the longitudinal axis LA of the holder. (It will be understood by those skilled in the art that the inner radial extents defined by individual filaments 105 will vary slightly over a range that is greater than the maximum or smaller than the minimum "average inner radial extent.") Through this arrangement, the free ends of the filaments 105 define a longitudinal opening 110 (e.g., a central longitudinal opening) extending through the internal dam 100. In the illustrated embodiment shown in FIG. 2A, the filaments 105 define a first longitudinal group of filaments 105a having a first average inner radial extent 112, and a second longitudinal group of filaments 105b having a second average inner radial extent 114 that is less than (broadly, different than) the first longitudinal group of filaments. Through this arrangement, a diameter or cross-sectional dimension of the longitudinal opening 110 is non-uniform longitudinally. In particular, in the illustrated embodiment in FIG. 2A, the longitudinal opening 110 has a first diameter at a rear longitudinal portion thereof, and a second diameter at a front longitudinal portion thereof that is greater than the first diameter. The larger second diameter provides clearance to facilitate insertion of the bundle of conductors through the opening 110, and the smaller first diameter provides a closer engagement of the filaments 105a with the conductors to inhibit the flow of the curable liquid through the opening along the conductors.

In one or more other embodiments, the filaments 105 may define more than two longitudinal groups of filaments. For example, the inner radial extents of the filaments 105 may taper, rather than transition sharply or stepwise as in the embodiment in FIG. 2A, to define a generally cone-shaped longitudinal opening. In another example, there may be two or more stepwise transitions of the inner radial extents of the filaments. Referring to FIG. 2B, in yet another embodiment of an internal dam 100', filaments 105' may have a generally uniform inner radial extent 116 (or lengths) to define a longitudinal opening 110' having a generally uniform diameter along its length. Moreover, as shown in FIGS. 2A and 2B, the filaments 105, 105' extend axially outward relative to the axis A of the annular filament holder 102. Other arrangements and constructions of the filaments may be possible.

The plurality of filaments 105, 105' may be made of any suitable material, such as, but not limited to, plastic, nylon, polypropylene, polystyrene, Tampico, horse hair, metal wire, etc. In one or more embodiments, the filaments 105, 105' are generally flexible or resiliently deflectable along their lengths. Preferably, the filaments 105, 105' themselves create a suitable barrier that inhibits the flow of curable liquid through dam 100, 100'. In particular, the filaments 105, 105' are suitable to engage the conductors and inhibit the flow of curable liquid along the conductors and between the conductors out of the compound chamber. In some situations, however, such as where more than one large conductor is used, fiber or other material may be packed in the space between the more than one conductor. Preferably, even when more than one conductor is used, the filaments 105, 105' fill any gaps between and around the more than one conductor. The illustrated internal dam is generally configured as an inverted disc brush or an inside disc brush.

Figure 3:
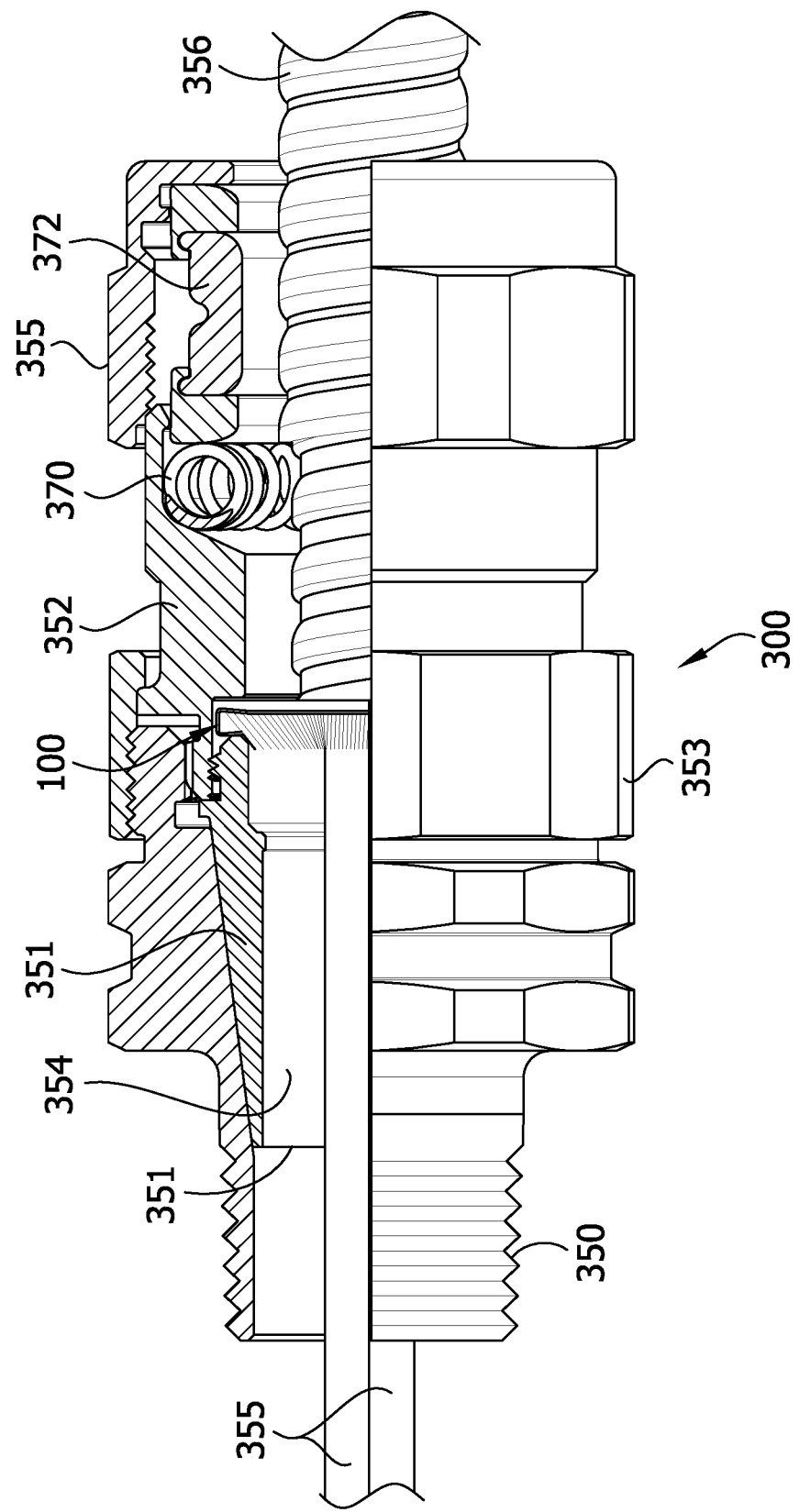
FIG. 3 is a longitudinal section of a cable gland including the internal dam of FIG. 1.
Figure 4:
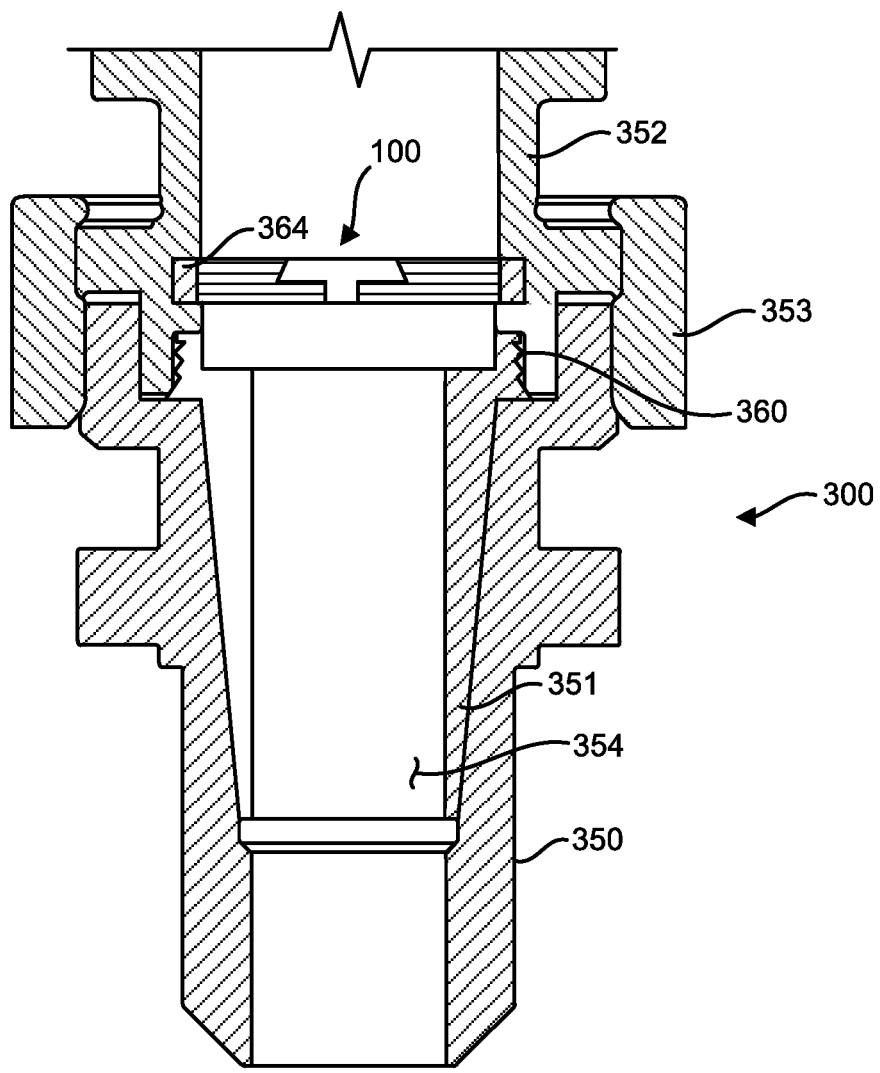
FIG. 4 is an enlarged portion of the longitudinal section of the cable gland.

FIGS. 3 and 4 show cross-sectional views of a cable gland 300 using the illustrated internal dam 100 of FIGS. 1 and 2A in accordance with certain exemplary embodiments. The cable gland 300 includes a hub body 350, a compound chamber 351, a union body 352, a union body nut 353, and a gland nut 355. In one or more embodiments, one or more of the components or elements of FIGS. 3 and 4 may be omitted, repeated, and/or substituted. Moreover, the internal dam described herein may be used with other cable glands having other constructions and designs.

The compound chamber 351 includes a cavity 354 that traverses the length of the compound chamber 351. The cavity 354 of the compound chamber 351 receives one or more conductors 355 that traverse the internal dam 100. The cavity 354 of the compound chamber 351 can also receive a sealing compound. The cavity 354 can have a substantially uniform horizontal cross-sectional area along the length of the cavity. Otherwise, the horizontal cross-sectional area along the length of the cavity 354 can vary. The cavity 354 is wide enough to allow one or more conductors 355 of a cable 356 to pass through. The cavity 354 can be a hollow sleeve that is removably coupled to the inner wall of the body of the compound chamber 351.

The compound chamber 351 can be seated within a cavity of the hub body 350. The compound chamber 351 can be coupled to the hub body 350 in one or more of a number of ways, including, but not limited to, fixedly, slidably, removably, threadably, and mechanically. The hub body 350 includes a cavity that traverses the length of the hub body 350. The hub body 350 is configured to be coupled to (e.g., threaded to) an enclosure of an electrical/electronic device. The hub body 350 can be made of a number of suitable materials. Such materials include, but are not limited to, metal, plastic, rubber, ceramic, and nylon. The hub body 350 can be made of the same or different materials used for the compound chamber 351.

The cavity of the hub body 350 can have one or more features that are complementary of the features on the outer side of the body of the compound chamber 351. For example, the cavity walls of the hub body 350 can have smooth surfaces that are disposed at angles that complement the smooth surfaces of the outer walls of the compound chamber 351. Alternatively, the cavity walls of the hub body 350 can have one or more features (e.g., a notch, mating thread, etc.) that mechanically couple with complementary features disposed on the outer walls of the compound chamber 351.

The union body nut 353 is used to mechanically couple the union body 352 to the compound chamber 351, and/or the hub body 350. The union body nut 353 can be coupled to the union body 352 and/or the hub body 350 in one or more of a number of ways, including, but not limited to, threadably, removably, clampably, and slidably. In other words, the union body nut 353 can be a nut, a clamp, a brace, or any other suitable fastening device that mechanically couples the union body 352, the compound chamber 351, and/or the hub body 350. The union body nut 353 can be made of one or more of a number of suitable materials. Examples include, but are not limited to, metal, plastic, rubber, ceramic, and nylon. The union body nut 353 can be made of the same or different materials used for the union body 352, the compound chamber 351, and/or the hub body 350.

When the compound chamber 351 is positioned inside of and/or coupled to the hub body 350, there can be a gap that is formed around at least a portion of the perimeter of the coupled components. A bottom portion of the union body 352 is positioned inside of this gap to mechanically couple the union body 352 to the hub body 350 and the compound chamber 351. The union body 352 also includes a cavity that traverses at least a portion of the union body 352 and through which one or more conductors 355 are passed and/or positioned.

The union body 352 can be made of one or more of a number of suitable materials. Examples of such materials include, but are not limited to, metal, plastic, rubber, ceramic, and nylon. The union body 352 can be made of the same or different materials as the compound chamber 351 and/or the hub body 350. Also, the shape (e.g., cylindrical, rectangular, etc.) of the cavity 354 of the union body 352 can be the same or different than the shape of the cavity 354 of the compound chamber 351.

The gland nut 358 is threadable mated to the union body 352 and configured to compress a spring 370 (or other grounding contact) and a bushing 372 within the union body. In use, the gland nut 358 is tightened on the union body 352 such that the bushing 372 seals around the armor of the cable and the spring electrically contacts the armor of the cable, as is generally known in the art. The bushing 372 is configured to generally inhibit dust, debris, water, and/or other liquid from entering the gland 300. The spring 370 (or other grounding contact) is configured to electrically ground the cable 356.

Figure 5:
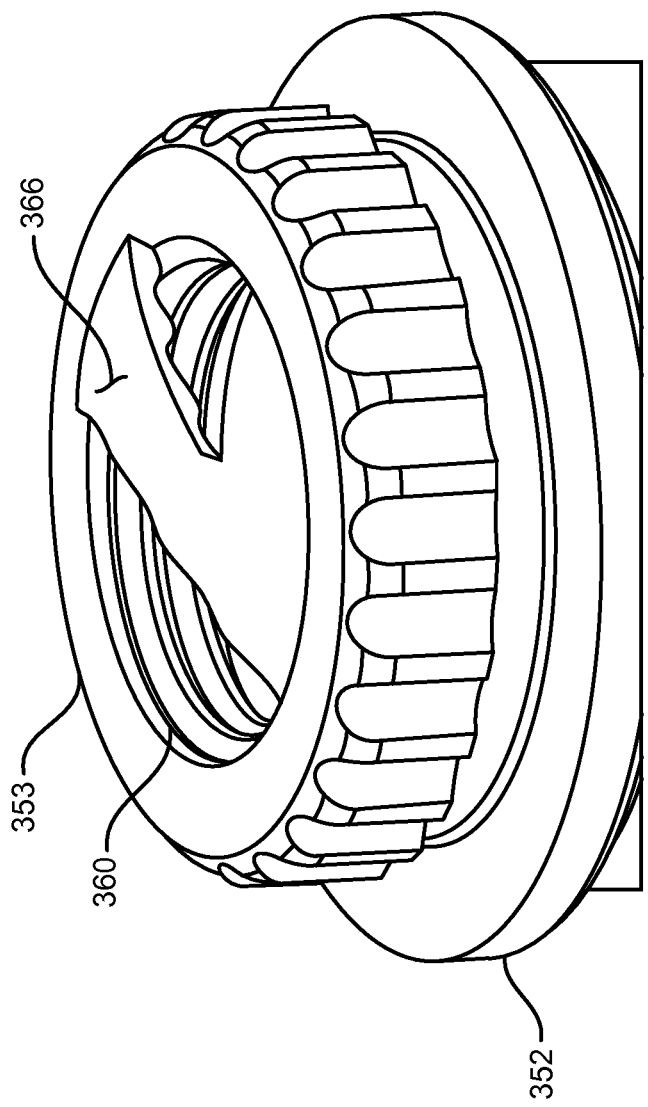
FIG. 5 is a perspective view of the union body with a threaded interface.

In one embodiment, the compound chamber 351 is threadably connected to the union body 352. In particular, the compound chamber 351 includes an external thread that threadably mates with internal thread of an opening 360 of the union body 352. The illustrated union body 352 defines an annular channel-shaped cavity 364, adjacent the internal threads, in which the internal dam 100 is captively received. In one example, shown in FIG. 5, the opening 360 of the union body 352 defines a helical groove 366 traversing the internal threads to facilitate insertion of the internal dam 100 into the annular channel-shaped cavity 364 without compromising the function of the internal threads. For example, the helical groove 366 may extend in a helical direction that is opposite the helical direction of the internal threads. As an example, the helical groove 366 may be a left-handed groove, and the internal thread may be a right-handed thread, or vice versa.

Figure 6B:
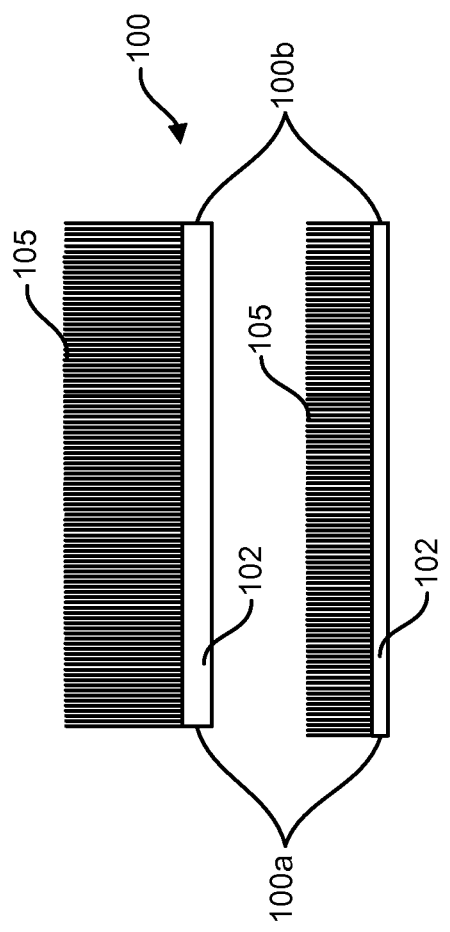
FIG. 6B is a front view of the filament holder in linear form.
Figure 6A:
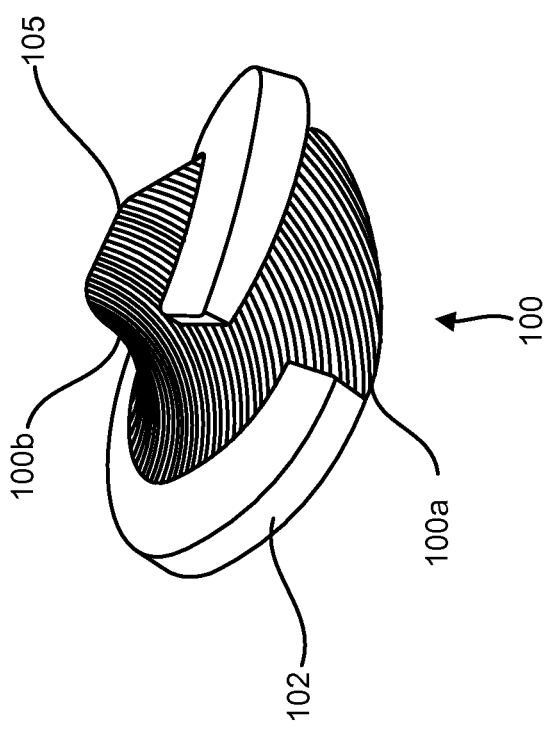
FIG. 6A is a perspective view of the internal dam in helical form.

To facilitate installation of the internal dam 100, the internal dam may be in an initial configuration, such as a helical shape (as shown in FIG. 6A) or linear shape (as shown in FIG. 6B), before insertion into the annular channel-shaped cavity 364. For example, the filament holder 102 of the internal dam 100 may be bent or otherwise formed (e.g., deformed) into the helical shape internal dam 100. In another example, the internal dam 100 may be in an unformed shape, such as linear as shown in FIG. 6B.

In one embodiment, where the dam 100 has an initial helical shape (FIG. 6A), a first end 100a of the filament holder 102 of the internal dam 100 may be inserted into the helical groove 366 of the opening 360 of the union body 351, and the dam may be rotated in the direction of and within the helical groove (e.g., left-hand direction) so that the filament holder follows the helical groove and the dam enters the annular channel-shaped cavity and flattens out (e.g., the annular filament holder deforms and takes on a generally planar shape as shown in FIG. 1), with the ends 100a, 100b of the filament holder generally opposing and abutting one another. When received in the annular channel-shaped cavity 364, the outer perimeter of the dam 100 (e.g., the outer diameter of the annular filament holder 102) may conform generally to the perimeter (e.g., inner diameter) of the annular channel-shaped cavity (as shown in FIG. 4) so that there is substantially no space between the opposing perimeter wall of the annular channel-shaped cavity and the outer perimeter wall of the annular filament holder. In this way, the effective area of the internal dam 100 (e.g., the effective area of the filaments 105) may be maximized to maximize the effective cross-sectional dimension of the bundle of conductors 355 that can pass through the dam. In one example, the dam 100 in its initial helical shape may be installed, such as set forth above, using a suitable machine or other automated process. In another example, the dam 100 in its initial helical shape may be installed, such as set forth above, manually.

In another embodiment, where the dam 100 has an initial linear shape (FIG. 6B), a first end 100a of the filament holder 102 of the internal dam 100 may be inserted into the helical groove 366 of the opening 360 of the union body 351, and the filament holder may be moved along and within the helical groove (e.g., left-hand direction) so that the filament holder follows the helical groove and the dam enters the annular channel-shaped cavity and forms into an annular, planar shape (e.g., the linear filament holder deforms and takes on an annular, generally planar shape as shown in FIG. 1), with the ends 100a, 100b of the filament holder generally oppose and abut one another. As with the embodiment with the dam 100 having the initial helical shape, when received in the annular channel-shaped cavity 360, the outer perimeter of the dam (e.g., the outer diameter of the annular filament holder 102) may conform generally to the perimeter (e.g., inner diameter) of the annular channel-shaped cavity so that there is substantially no space between the opposing perimeter wall of the annular channel-shaped cavity and the outer perimeter wall of the annular filament holder, thus having the same benefit as described above with respect to the embodiment with the dam having the initial helical shape.

Figure 7:
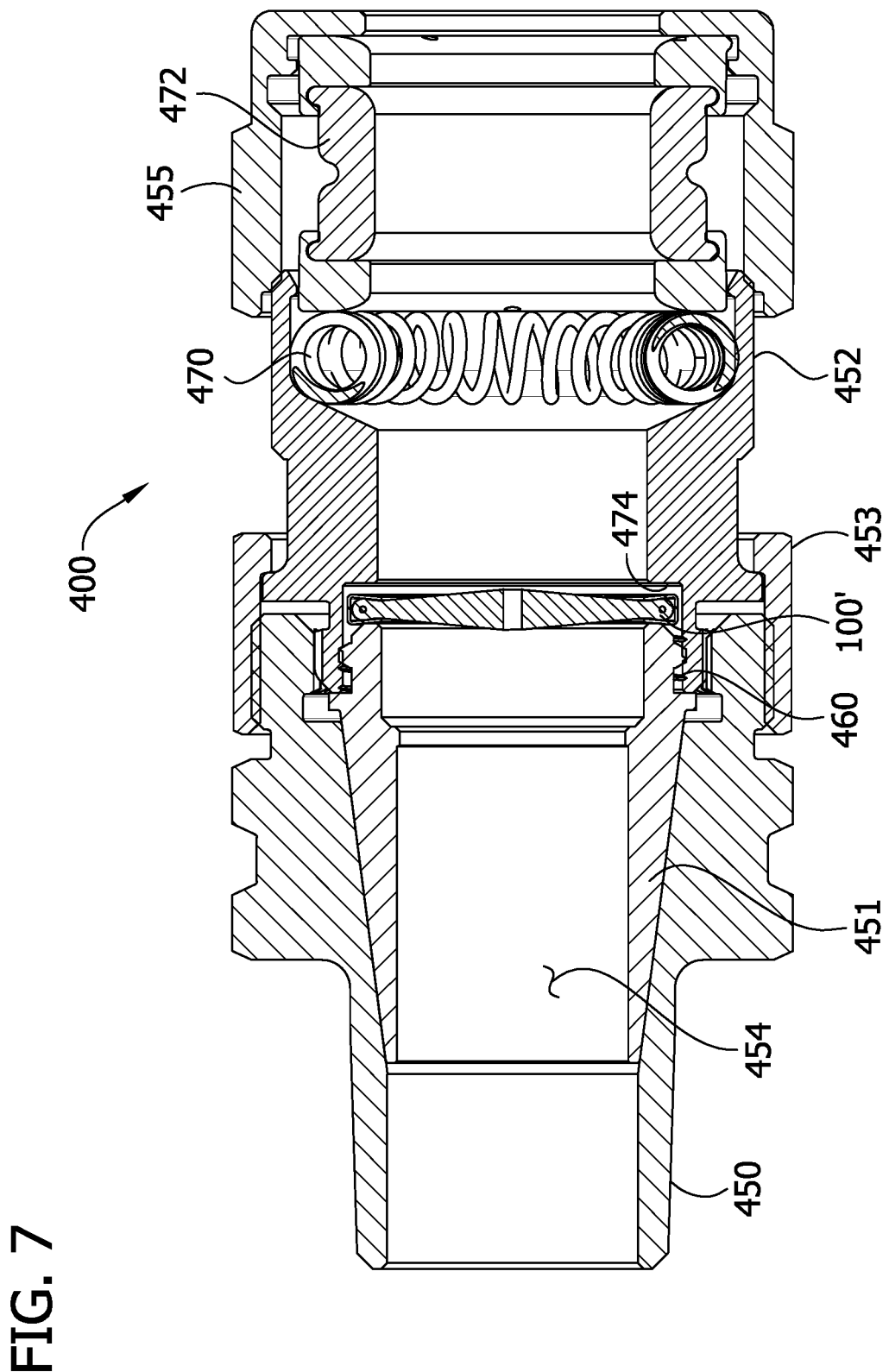
FIG. 7 is a longitudinal section of another embodiment of a cable gland including the internal dam of FIG. 1.

FIGS. 7 and 8 show cross-sectional and exploded views of another embodiment of a cable gland 400 using the illustrated internal dam 100' of FIG. 2B. The cable gland 400 is similar to the previous embodiments described herein. The cable gland 400 includes a hub body 450, a compound chamber 451 defining cavity 454, a union body 452 defining an opening 460, a union body nut 453, gland nut 455, a grounding spring 470 (or other grounding contact), and a bushing 472. These components function in the same manner as corresponding components described above, and the description of the components described above apply equally to the present components. In one or more embodiments, one or more of the components or elements of FIGS. 7 and 8 may be omitted, repeated, and/or substituted.

The main difference between the gland 300 and the present gland 400 is the union body 452 and the way in which the internal dam 100' is secured within the union body. Unlike the union body 352 of FIG. 3, the present union body 452 does not define a channel-shaped cavity. Instead, the internal dam 100' is held captive between an internal shoulder 474 of the union body 452 and the compound chamber 451 which is threadably mated to the union body. In this way, the internal dam 100' can be easily inserted into the union body 452 and held captive therein by threading or otherwise securing the compound chamber 451 to the union body.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there are additional elements other than the listed elements.

As various changes could be made in the above products without departing from the scope of the invention, it is intended that all matter contained in the above description and shown in the accompanying drawings shall be interpreted as illustrative and not in a limiting sense.

The invention claimed is:

1. A cable gland comprising:
    a cavity having first and second axial ends, the cavity being configured to receive one or more conductors and a curable liquid therein; and
    an internal dam adjacent a second axial end of the cavity, the internal dam including
        an annular filament holder defining an axis, and
        a plurality of filaments secured to and extending radially inward from the annular filament holder generally toward the axis of the annular filament holder,
    wherein the internal dam is configured to axially receive the one or more conductors through the annular filament holder such that the plurality of filaments surround the one or more conductors and inhibit the curable liquid received in the cavity from flowing through the internal dam and from flowing between the internal dam and the one or conductors, and wherein the plurality of filaments are non-metallic.

2. The cable gland of claim 1, wherein the plurality of filaments are generally flexible.

3. The cable gland of claim 1, wherein the plurality of filaments comprise one or more of plastic, nylon, polypropylene, polystyrene, Tampico, or horse hair.

4. The cable gland of claim 1, wherein the plurality of filaments comprise plastic.

5. The cable gland of claim 4, wherein the plurality of filaments comprise nylon.

6. The cable gland of claim 4, wherein the plurality of filaments comprise polypropylene.

7. The cable gland of claim 4, wherein the plurality of filaments comprise polystyrene.

8. The cable gland of claim 1, wherein the plurality of filaments have generally uniform lengths.

9. The cable gland of claim 1, wherein the plurality of filaments define an opening at the axis of the annular filament holder.

10. The cable gland of claim 1, wherein the plurality of filaments extend axially outward from the annular filament holder.

11. The cable gland of claim 1, further comprising a bushing configured to sealingly engage armor in which the one or more conductors are received.

12. A method of installing a cable gland comprising:
inserting a cable into the cable gland such that one or more conductors of the cable extend through an internal dam and a cavity of the cable gland, and a plurality of filaments of the internal dam surround the one or more conductors; and
pouring a curable liquid into the cavity, wherein the internal dam inhibits the curable liquid from flowing through the internal dam and from flowing between the internal dam and the one or more conductors;
wherein the one or more conductors comprises a plurality of conductors, wherein at least some of the plurality of filaments fill gaps between the plurality of conductors.

13. The method of installing the cable gland set forth in claim 12, wherein the plurality of filaments resiliently deflect along their respective lengths when the one or more conductors extends through the internal dam.

14. The method of installing the cable gland set forth in claim 12, wherein the internal dam includes an annular filament holder defining an axis, wherein the plurality of filaments are secured to and extending radially inward from the annular filament holder generally toward the axis of the annular filament holder.

15. The method of installing a cable gland set forth in claim 12, wherein the plurality of filaments are non-metallic.

16. A connector comprising:
a connector body defining a longitudinal passage having an axis; and
an internal dam disposed within the longitudinal passage defined by the connector body, the internal dam including a plurality of filaments extending around the axis of the longitudinal passage axis, wherein the plurality of filaments are non-metallic.

17. The connector set forth in claim 16, wherein the internal dam is an inverted disc brush.

18. The connector set forth in claim 16, wherein radially inner free ends of the plurality of filaments define a longitudinal opening.

19. The connector set forth in claim 18, a diameter of the longitudinal opening is non-uniform longitudinally.

20. The connector set forth in claim 16, wherein the internal dam includes an annular filament holder to which the plurality of filaments are secured.

* * * * *